United States Patent Office 2,849,433
Patented Aug. 26, 1958

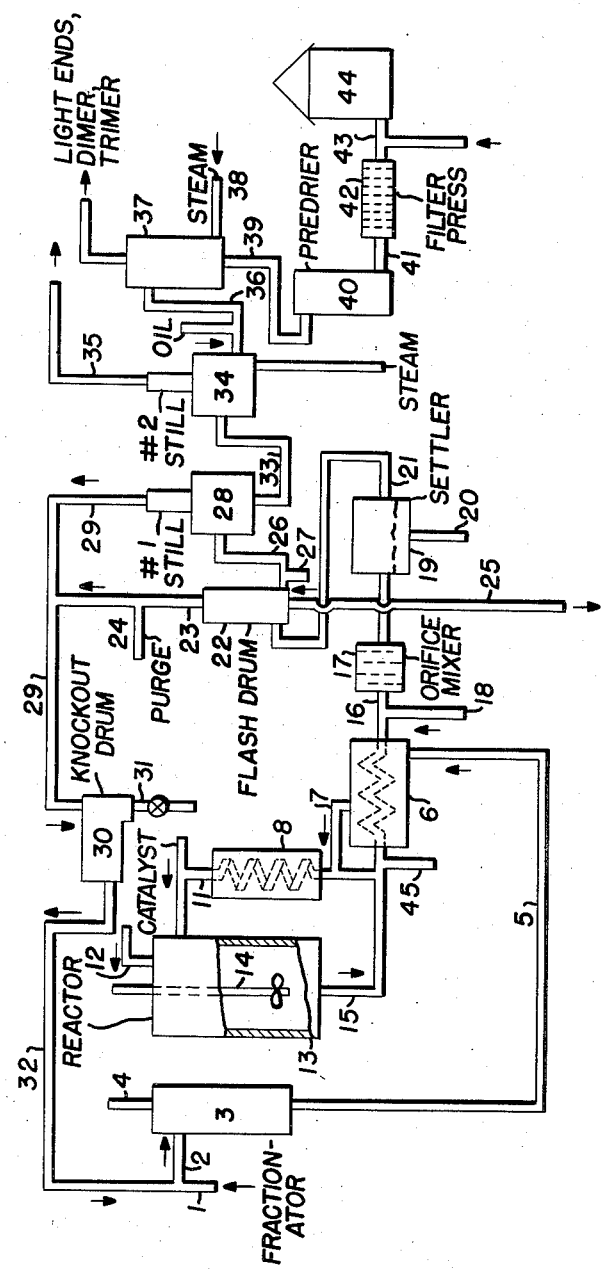

2,849,433

INACTIVATION OF FRIEDEL-CRAFTS CATALYST SYSTEMS

Helmuth G. Schneider, Westfield, and Hans G. Goering, Elizabeth, N. J., and Vincent F. Mistretta, Chicago, Ill., assignors to Esso Research and Engineering Company, a corporation of Delaware Application December 31, 1953, Serial No. 401,576

2 Claims. (Cl. 260—94.8)

This invention relates to an improved method for deactivating catalyst residues and relates more particularly to the deactivation of residues of Friedel Crafts catalysts, such as aluminum chloride, used in the polymerization of various types of unsaturated hydrocarbons.

Many types of hydrocarbon polymerizations employ metal halides of the Friedel Crafts type as catalysts. Among these polymerizations is the polymerization of iso-olefins, such as isobutylene, to solid rubbery polymers. Aluminum chloride is the most generally used of the Friedel Crafts catalysts, but aluminum bromide, titanium tetrachloride and zirconium tetrachloride are used also.

At the end of the reaction the product must be treated to completely destroy residual catalyst and to prevent the product from going off color. It is known that a good proportion of the catalyst is actually bound up with the polymer, i. e. it terminates the polymer chain. If this catalyst is not released from the polymer and destroyed, the resulting product is so color unstable as to be unmarketable. Various materials have been used for this purpose. For example, alcohols, such as methanol and ethanol, and alkalis, such as sodium hydroxide, can be used. Sodium hydroxide is used because of its convenience, ready availability, and cheapness. However, it has been considered necessary to use a large excess of the caustic in order to completely eliminate the catalyst. This in turn requires further washing to remove the excess caustic from the polymer. This excessive washing results in the formation of emulsions which are difficult to break. Furthermore, the use of strong caustic causes the resulting polymer to lose color stability.

In application Serial 316,556, filed October 23, 1952, and now abandoned, in the name of Helmuth G. Schneider and William C. Van Siclen, it has been proposed to overcome these difficulties by adding at least one volume of aqueous caustic containing 10 to 100% molar excess of sodium hydroxide to the reactor contents and allowing the mixture to stand at a temperature between 20° and 65° C. for a time sufficient to complete the reaction and cause the precipitation of the aluminate salts, thus completely destroying the catalyst.

However, when it is desired to pass the reactor contents in heat exchange with the fresh feed to cool the feed, the precipitation of salts in such volume will plug up the exchanger tubes and cause the shut down of the equipment for cleaning out. If the catalyst is not inactivated until after the heat exchange, the presence of catalyst in the stream passing through the exchanger will cause additional polymerization resulting in deterioration of the product.

It is therefore the major object of the present invention to provide a method for effectively inactivating (i. e., slowing the rate of the reaction to a low or negligible value) the catalyst used in the polymerization of iso-olefins while at the same time cooling the feed by heat exchange with the reactor effluent.

In accordance with this invention, this and other objects are accomplished by carrying out the inactivation of the catalyst in two stages. The reactor effluent is contacted, as soon as it is withdrawn, with 0.23 to 1.2 weight percent of aqueous 0 to 1% caustic. This amount of caustic reduces the deterioration in molecular weight of the polymer by after polymerization sufficiently so that the effluent can be passed in heat exchange with fresh feed. The polymer effluent from the heat exchanger is then treated to completely destroy the catalyst by adding 10 to 100% molar excess of caustic and settling at 20° to 65° C. to precipitate all of the aluminum.

The invention is particularly adapted to processes for the polymerization of solid polymers from isobutylene or a hydrocarbon fraction containing it by contacting the isobutylene, preferably in a diluent such as hexane, with finely divided solid aluminum chloride or a slurry thereof in hexane at a temperature between −80° C. and +40° C. The polymer as it forms dissolves in the large excess of hexane present in the reactor and is withdrawn as a slurry with aluminum chloride.

The manner in which the present invention is carried out will be fully understood from the following description when read with reference to the accompanying drawing.

A mixture of hexane and pure isobutylene in line 1 is mixed with recycled isobutylene and hexane in line 32. This recycled isobutylene however, contains a small amount of water as a contaminant. The isobutylene is introduced by line 2 into distillation tower 3 where the water is removed overhead through line 4 with a small amount of the hydrocarbons. Pure, dry isobutylene-hexane mixture is withdrawn through line 5 and passed through heat exchanger 6 and line 7 to cooler 8, where it is cooled to the approximate polymerization temperature, e. g. −40° F. From cooler 8 it is passed by line 11 to the reactor 13. A slurry of 5% aluminum chloride in hexane at a temperature no higher than −10° F. is added to reactor 13 by line 12. The catalyst slurry is added at a rate of 1 lb. AlCl$_3$ per hour, per 100 gallon feed and the slurry is mixed with the feed by stirrer 14 so that the catalyst is maintained in suspension. Reactor 13 is a conventional low temperature reactor provided with external refrigeration by a conventional ethane cooler.

Polymer, as it is formed, dissolves in the large excess of hexane present in the reactor and is thus prevented from depositing on the surfaces of the reaction vessel. The solution of polymer in hexane is withdrawn as a slurry with aluminum chloride through line 15. Water or dilute caustic is added to the slurry in line 15 by means of line 45 and the resulting mixture is passed through heat exchanger 6, where it cools incoming feed. The heated polymer solution leaves the heat exchanger by line 16 and is contacted in orifice mixer 17 with the desired molar excess of dilute caustic between 10 and 100% introduced through line 18 to completely destroy the catalyst. This forms neutralization salts of aluminum which are settled out in settler 19, where two layers are formed, an upper layer consisting of a solution of polymer in hexane and isobutylene and a lower layer of dilute caustic containing neutralization salts of aluminum. The bottom layer is withdrawn through line 20 and the upper layer is passed by line 21 to flash drum 22, where the lower boiling materials are flashed off through line 23. A purge stream may be withdrawn through line 24, if desired. A polyisobutylene hexane solution is withdrawn from the bottom of flash drum 22 through line 25.

A solution of isobutylene polymer in hexane is withdrawn as a side stream from flash drum 22 by line 26. A lubricating oil such as Essolube 20 is added to this stream through line 27 as a heavy carrier oil for the polymer. This mixture is passed to still 28, where it is distilled at a temperature of 200° F. under a pressure of 15 lbs. per sq. in. gage. A stream containing approximately 13% isobutylene and 85% hexane is withdrawn from the still through line 29, combined with the overhead from flash drum 22 and passed into knockout drum 30, where any water present in this stream is settled out and removed through line 31. The substantially dry mixture of isobutylene and hexane is recycled to distillation tower 3 by line 32 and line 2.

Bottoms from still 28 are passed by line 33 to a second still 34 operating at 300° F. under a pressure of 15 lbs. per sq. in. gage. This still removes the last traces of isobutylene and the remainder of the hexane from the solution of polymer in oil. The overhead withdrawn by line 35 from the top of still 34 consists of about 7% isobutylene, 85% hexane, the water from steam injection and other minor constituents. Bottoms from still 34 are withdrawn by line 36 and passed to a third still 37. Still 37 is operated at atmospheric pressure and 300° F. to give an overhead stream containing any dimer and trimer present. Dry steam is admitted through line 38 to the base of still 37 to facilitate stripping off the light ends. Bottoms from still 37 are passed by line 39 to air drier 40 to remove any remaining moisture. The dried oil-polymer solution is then passed by line 41 to filter press 42 to remove any remaining aluminum salts. The finished solution of polybutene in oil is then passed by line 43 to storage tank 44.

The following examples illustrate the benefits to be obtained by the practice of the present invention:

*Example 1*

A mixture of 30% isobutylene and 70% hexane was polymerized at −40° C. in the presence of 0.95% finely divided aluminum chloride to yield a solution of 20% polyisobutylene in hexane slurried with 0.3 wt. percent aluminum chloride. Different portions of the reactor effluent were treated with different amounts of water and dilute caustic and the degree of quenching determined. The following data were obtained:

| Type quench | Mol. percent on catalyst | Weight percent on reactor liquor | Polymer mol. weight (Staud.) | Percent drop in mol. weight from average control |
|---|---|---|---|---|
| none | | | 17,900 | 35 |
| $H_2O$ | 200 | 0.23 | 20,600 | 25 |
| 1% aqueous NaOH | [1] 200 | 0.23 | 21,600 | 22 |
| 1% aqueous NaOH | [1] 1,000 | 1.16 | 24,600 | 11 |
| Avg. control sample [2] | | | 27,600 | |

[1] i. e. considered as 99% $H_2O$ for the molar relationship.
[2] Control samples were quenched with large excess of an acetone-water solution.

The above data show that as little as 0.23 wt. percent of water or of 1% aqueous caustic has some deactivating action, (the degree of deactivating being measured by the polymer molecular weight drop from an average control), while 1.2 wt. percent of 1% aqueous caustic is a good deactivating agent for solid aluminum chloride.

The nature and objects of the present invention having been thus described and illustrated, what is claimed as new and useful and is desired to be secured by Letters Patent is:

1. Process for preparing polyisobutylene which comprises contacting a mixture of isobutylene and hexane at −80° to +40° C. in the presence of finely divided solid Friedel Crafts catalyst and contacting the reactor effluent immediately with 0.23 to 1.2 wt. percent of water containing up to 1% caustic to deactivate the catalyst, passing the deactivated effluent in heat exchange with the fresh feed and washing the heat exchanged effluent with at least equal volumes of aqueous caustic per volume of reaction product, said caustic containing between 10 and 100 mol percent excess sodium hydroxide over that theoretically necessary to react with the catalyst.

2. Process according to claim 1 in which the catalyst is aluminum chloride.

References Cited in the file of this patent

UNITED STATES PATENTS

| | | |
|---|---|---|
| 2,125,872 | Arveson | Aug. 9, 1938 |
| 2,387,543 | Thomas | Oct. 23, 1945 |